US012682512B2

(12) United States Patent
Keserwani et al.

(10) Patent No.: US 12,682,512 B2
(45) Date of Patent: Jul. 14, 2026

(54) METHOD AND ELECTRONIC DEVICE FOR GENERATING CONTENT USING A DIFFUSION MODEL

(71) Applicant: SAMSUNG ELECTRONICS CO., LTD., Suwon-si (KR)

(72) Inventors: Prateek Keserwani, Uttar Pradesh (IN); Sukumar Moharana, Bangalore (IN); Alladi Ashok Kumar Senapati, Bangalore (IN); Sajith Ummanath, Bangalore (IN); Azhan Ali, Uttar Pradesh (IN); Venkappa Mala, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 126 days.

(21) Appl. No.: 18/821,364

(22) Filed: Aug. 30, 2024

(65) Prior Publication Data

US 2025/0078337 A1     Mar. 6, 2025

Related U.S. Application Data

(63) Continuation of application No. PCT/KR2024/012281, filed on Aug. 19, 2024.

(30) Foreign Application Priority Data

Aug. 31, 2023  (IN) .............................. 202341058578
Jul. 17, 2024  (IN) .............................. 202341058578

(51) Int. Cl.
  *G06T 11/00*      (2026.01)
  *G06T 5/60*       (2024.01)
  *G06T 5/70*       (2024.01)

(52) U.S. Cl.
  CPC ................ *G06T 11/00* (2013.01); *G06T 5/60* (2024.01); *G06T 5/70* (2024.01); *G06T 2207/20081* (2013.01); *G06T 2207/20084* (2013.01)

(58) Field of Classification Search
  CPC ... G06T 11/00; G06T 5/60; G06T 5/70; G06T 2207/20081; G06T 2207/20084
  See application file for complete search history.

(56) References Cited

U.S. PATENT DOCUMENTS 12,154,302 B2     11/2024  Lee et al.
2022/0180569 A1    6/2022  Lee et al.
            (Continued)

FOREIGN PATENT DOCUMENTS

CN          116402719 A      7/2023
KR    10-2023-0069501 A      5/2023
            (Continued)

OTHER PUBLICATIONS

Moon et al., "Fine-tuning Diffusion Models with Limited Data", NeurIPS 2022 Workshop on Score-Based Methods, Nov. 29, 2022, 15 total pages.
            (Continued)

*Primary Examiner* — Tammy Paige Goddard
(74) *Attorney, Agent, or Firm* — Sughrue Mion, PLLC

(57) ABSTRACT

A method for generating content using a diffusion model of an electronic device, may include: obtaining latent vectors of an input content; inputting the latent vectors into a first lightweight adapter configured for the first application type from among a plurality of lightweight adapters configured individually for application types of the plurality of applications; transforming the latent vectors of the input content into a plurality of intermediate latent vectors using the first lightweight adapter; performing a denoising operation to
            (Continued)

transform the plurality of intermediate latent vectors into a plurality of next operation vectors; and generating the final content belonging to the application type by decoding the next operation vectors; and outputting the final content.

20 Claims, 10 Drawing Sheets

(56)                References Cited

U.S. PATENT DOCUMENTS

| | | |
|---|---|---|
| 2023/0095092 A1 | 3/2023 | Xiao et al. |
| 2023/0154069 A1 | 5/2023 | Ye et al. |
| 2023/0267315 A1 | 8/2023 | Kingma et al. |
| 2023/0377099 A1 | 11/2023 | Kreis et al. |

FOREIGN PATENT DOCUMENTS

| | | |
|---|---|---|
| KR | 10-2023-0094951 A | 6/2023 |
| WO | 2023/144385 A1 | 8/2023 |

OTHER PUBLICATIONS

International Search Report and Written Opinion (PCT/ISA/220, PCT/ISA/210, and PCT/ISA/237) dated Nov. 21, 2024, issued by International Searching Authority for International Application No. PCT/KR2024/012281.

T. Salimans & J. Ho; "Progressive Distillation for Fast Sampling of Diffusion Models"; Published as a conference paper at ICLR 2022, arXiv:2202.00512v2 [cs.LG]; Jun. 7, 2022; Total 21 pages.

C. Meng, et al.; "On Distillation of Guided Diffusion Medels"; CVPR 2023, pp. 14297-14306.

702 obtaining latent vectors of an input content

Figure 7A:
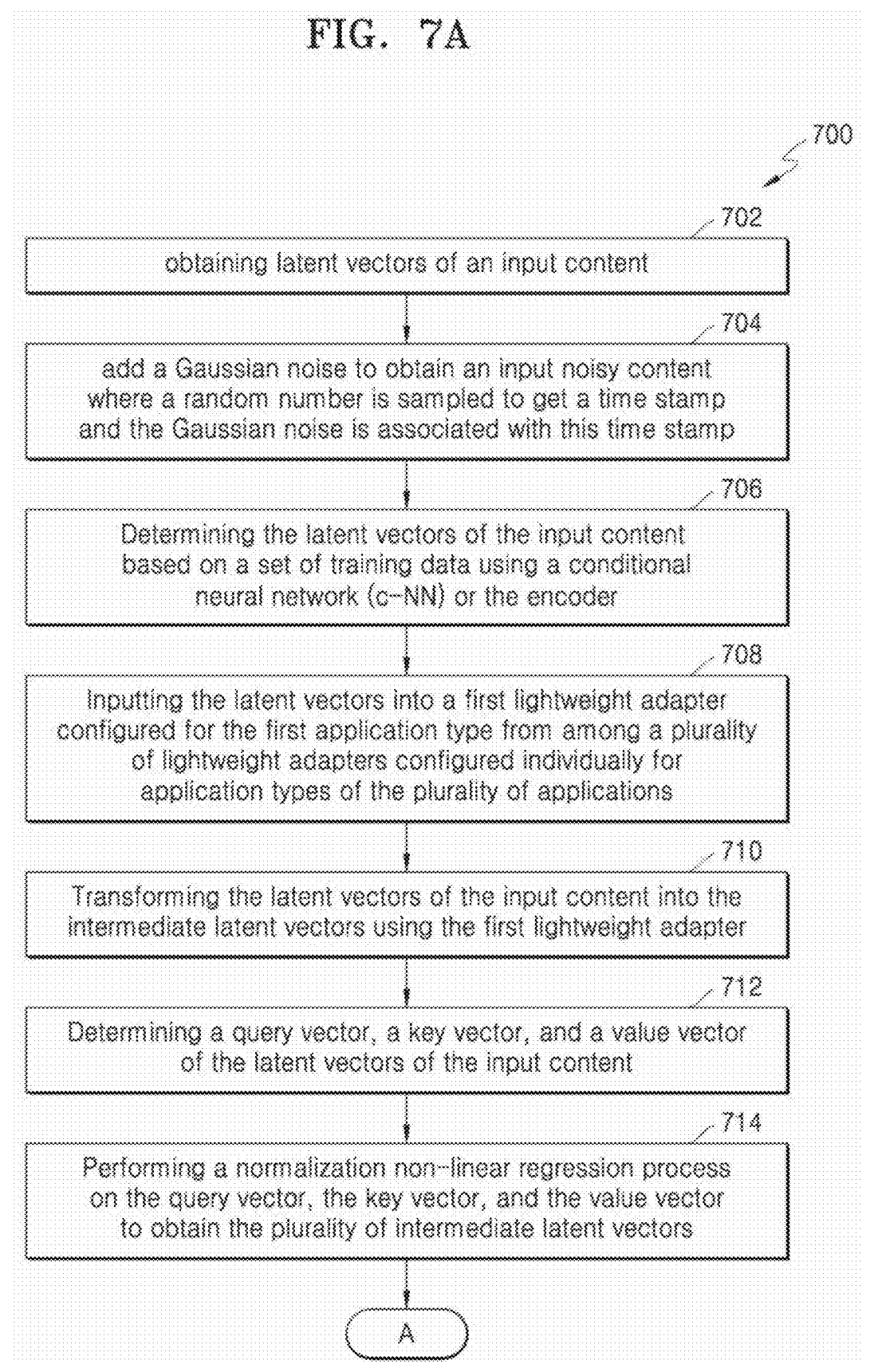

704 add a Gaussian noise to obtain an input noisy content
where a random number is sampled to get a time stamp
and the Gaussian noise is associated with this time stamp

706

Determining the latent vectors of the input content
based on a set of training data using a conditional
neural network (c-NN) or the encoder

708

Inputting the latent vectors into a first lightweight adapter
configured for the first application type from among a plurality
of lightweight adapters configured individually for
application types of the plurality of applications

710

Transforming the latent vectors of the input content into the
intermediate latent vectors using the first lightweight adapter

712

Determining a query vector, a key vector, and a value vector
of the latent vectors of the input content

714

Performing a normalization non-linear regression process
on the query vector, the key vector, and the value vector
to obtain the plurality of intermediate latent vectors

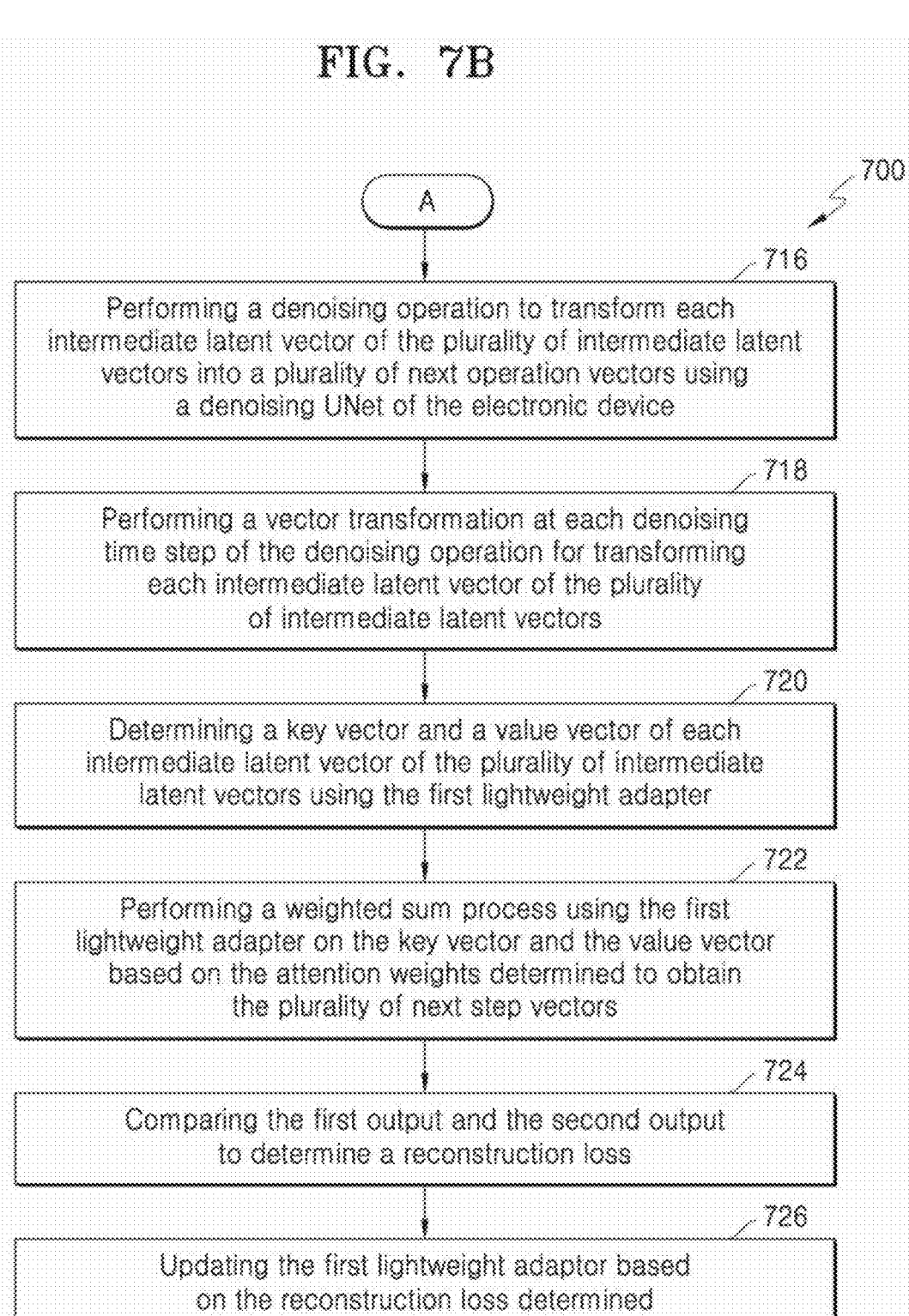

700

A

716

Performing a denoising operation to transform each intermediate latent vector of the plurality of intermediate latent vectors into a plurality of next operation vectors using a denoising UNet of the electronic device

718

Performing a vector transformation at each denoising time step of the denoising operation for transforming each intermediate latent vector of the plurality of intermediate latent vectors

720

Determining a key vector and a value vector of each intermediate latent vector of the plurality of intermediate latent vectors using the first lightweight adapter

722

Performing a weighted sum process using the first lightweight adapter on the key vector and the value vector based on the attention weights determined to obtain the plurality of next step vectors

724

Comparing the first output and the second output to determine a reconstruction loss

726

Updating the first lightweight adaptor based on the reconstruction loss determined

FIG. 8

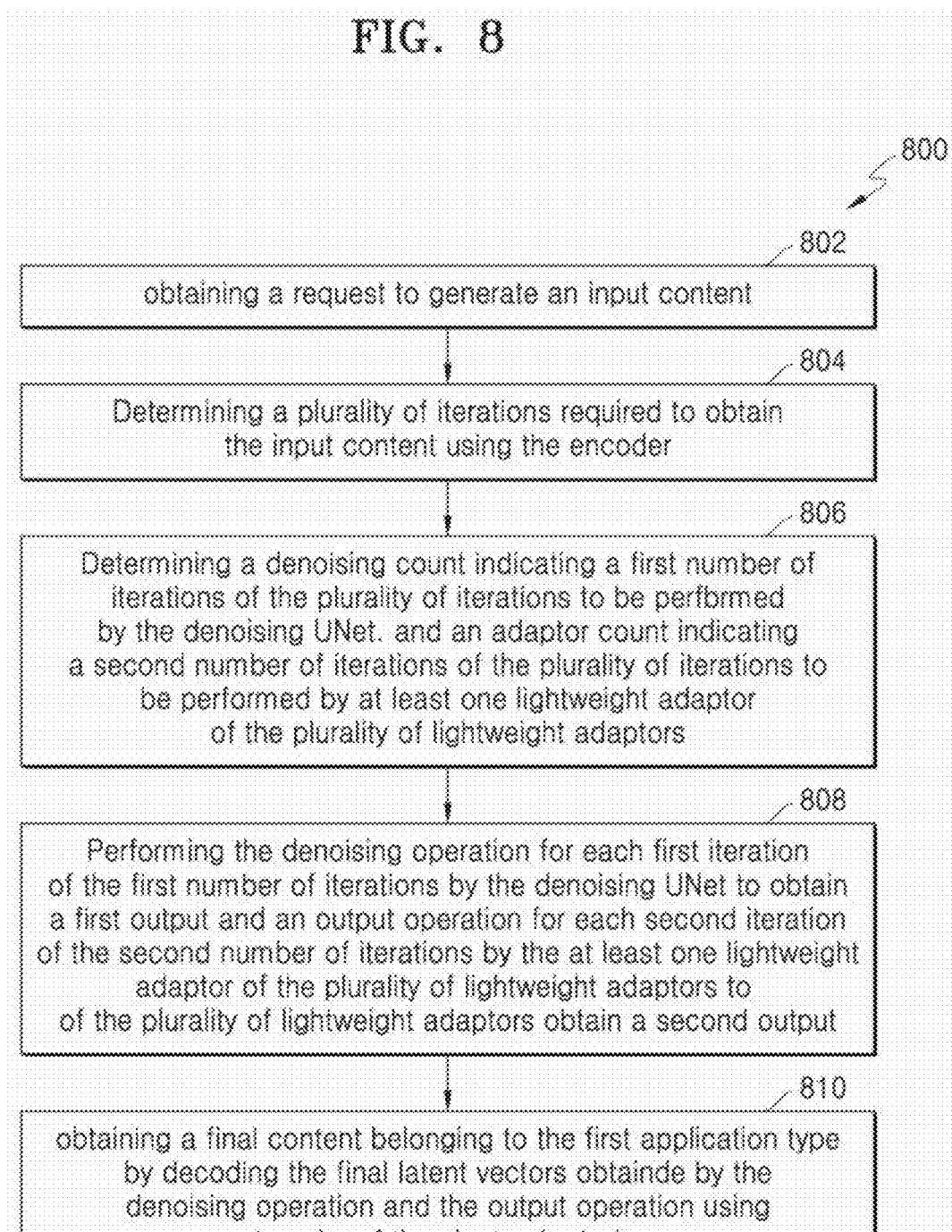

800

802
obtaining a request to generate an input content

804
Determining a plurality of iterations required to obtain
the input content using the encoder 806
Determining a denoising count indicating a first number of
iterations of the plurality of iterations to be performed
by the denoising UNet. and an adaptor count indicating
a second number of iterations of the plurality of iterations to
be performed by at least one lightweight adaptor
of the plurality of lightweight adaptors 808
Performing the denoising operation for each first iteration
of the first number of iterations by the denoising UNet to obtain
a first output and an output operation for each second iteration
of the second number of iterations by the at least one lightweight
adaptor of the plurality of lightweight adaptors to
of the plurality of lightweight adaptors obtain a second output 810
obtaining a final content belonging to the first application type
by decoding the final latent vectors obtainde by the
denoising operation and the output operation using
decoder of the electronic device

METHOD AND ELECTRONIC DEVICE FOR GENERATING CONTENT USING A DIFFUSION MODEL

CROSS REFERENCE TO RELATED APPLICATIONS

This is a bypass continuation of International Application No. PCT/KR2024/012281, filed Aug. 18, 2024 in the Korean receiving office. This application also claims benefit of priority to Indian Provisional Patent Application No. 202341058578 filed on Aug. 31, 2023, and Indian Patent Application No. 202341058578 filed on Jul. 17, 2024. The disclosures of these applications are incorporated herein by reference in their entirety.

BACKGROUND

1. Field

The present disclosure is related to an artificial intelligence (AI) model. More particularly the present disclosure is related to a system and method for generating content using a diffusion based generative AI model of an electronic device.

2. Description of Related Art

Latent Diffusion Models (LDMs) represent a significant advancement in the field of generative models, particularly for generating complex data such as images and text. The core mechanism of LDMs involves the transformation of input data into a lower-dimensional latent representation through an encoder. This latent representation retains the essential features of the input data while compressing its dimensionality. Subsequently, a forward diffusion method introduces Gaussian noise to the latent representation over a series of time operations, progressively degrading the signal until it becomes almost entirely noisy. The reverse diffusion method, which is trained using a neural network, aims to iteratively remove the added noise, reconstructing a clean latent representation operation by operation. Finally, a decoder maps this clean latent representation back to the original data space, yielding a realistic and high-quality output.

Despite the notable advantages of LDMs in generating high-fidelity data, several challenges and limitations persist. One primary concern is the requirement for extensive training to enable the model to denoise the latent variables effectively at each operation of the reverse diffusion method. This iterative training method can be computationally intensive and time-consuming. Further, the current implementations of LDMs necessitate a relatively high number of denoising operations to achieve the desired quality of the final output. Each operation requires careful monitoring of the noise distribution and direction, further complicating the method.

The high number of denoising operations directly impacts both the time and computational resources required to generate the final content. The increased number of operations not only prolongs the generation method but also escalates the associated costs. Further, in some cases, LDMs may undergo multiple iterations to produce the final output, further exacerbating the time and resource consumption. This iterative nature of the diffusion method can make the overall generation procedure inefficient and impractical for real-time or large-scale applications.

SUMMARY

Given these challenges, there is a desire to address the aforementioned problems and limitations associated with LDMs. Developing methods to reduce the number of denoising operations, enhance the efficiency of the training method, and minimize the computational overhead would be highly beneficial. Such improvements would not only streamline the generation method but also make LDMs more viable for a broader range of applications, offering a useful alternative to the current state of the art.

According to an embodiment of the disclosure, a method for generating content using a diffusion model of an electronic device, may include obtaining, by the electronic device, latent vectors of an input content, wherein the input content belongs to a first application type from among a plurality of applications in the electronic device. According to an embodiment of the disclosure, the method may include inputting, by the electronic device, the latent vectors into a first lightweight adapter configured for the first application type from among a plurality of lightweight adapters configured individually for application types of the plurality of applications. According to an embodiment of the disclosure, the method may include transforming, by the electronic device, the latent vectors of the input content into a plurality of intermediate latent vectors using the first lightweight adapter, wherein the plurality of intermediate latent vectors are closer to a final content belonging to the first application type. According to an embodiment of the disclosure, the method may include performing, by the electronic device, a denoising operation to transform the plurality of intermediate latent vectors into a plurality of next operation vectors using a denoising U-Net of the electronic device. According to an embodiment of the disclosure, the method may include obtaining, by the electronic device, the final content belonging to the first application type by decoding the next operation vectors. According to an embodiment of the disclosure, the method may include outputting, by the electronic device, the final content.

According to an embodiment of the disclosure, an electronic device for generating content using a diffusion model, may include memory storing instructions. The electronic device may include at least one processor including processing circuitry. The electronic device may include a latent diffusion model (LDM) controller, operatively coupled to the memory and the at least one processor. The LDM controller may be configured to execute the instructions that cause the electronic device to obtain latent vectors of an input content using an encoder, wherein the input content belongs to a first application type from among a plurality of applications in the electronic device. The LDM controller may be configured to execute the instructions that cause the electronic device to input the latent vectors into a first lightweight adapter configured for the first application type from among a plurality of lightweight adapters configured individually for application types of the plurality of applications. The LDM controller may be configured to execute the instructions that cause the electronic device to transform the latent vectors of the input content into a plurality of intermediate latent vectors using the first lightweight adapter, wherein the plurality of intermediate latent vectors are closer to a final content belonging to the first application type. The LDM controller may be configured to execute the instructions that cause the electronic device to perform a denoising operation to transform the plurality of intermediate latent vectors into a plurality of next operation vectors using a denoising U-Net. The LDM controller may be configured to execute the instructions that cause the electronic device to generate the final content belonging to the first application type by decoding the next operation vectors using a decoder. The LDM controller may be configured to execute the instructions that cause the electronic device to output the final content.

According to an embodiment of the disclosure, a non-transitory computer-readable storage medium storing instructions is provided. The instructions, when executed by at least one processor, cause the electronic device to perform the method.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications be made within the scope of the embodiments herein.

BRIEF DESCRIPTION OF THE DRAWINGS

These and other features, aspects, and advantages of the present embodiments are illustrated in the accompanying drawings, throughout which like reference letters indicate corresponding parts in the various figures. The embodiments herein will be better understood from the following description with reference to the drawings, in which:

Figure 1A:
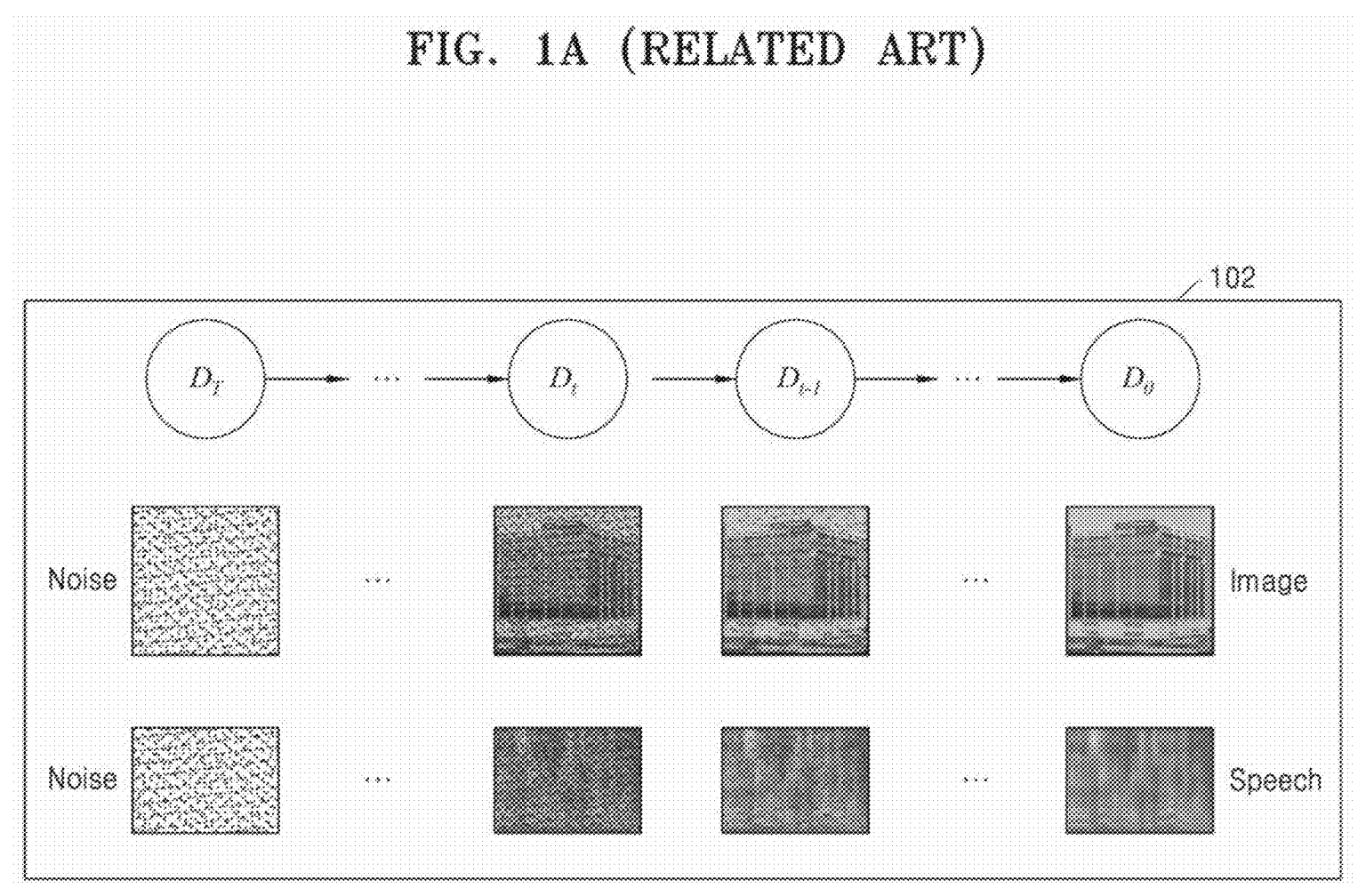

FIG. 1A is a block diagram that illustrates an example of a Markov chain as diffusion according to related art;

FIG. 5 is a block diagram that illustrates a view of a task-specific adapter of the LDM controller of the electronic device of FIG. 4 according to one or more embodiments;

FIG. 7A is a flow diagram illustrating a method for training a diffusion-based generative AI model of an electronic device according to one or more embodiments;

FIG. 7B is a flow diagram illustrating a method for training a diffusion-based generative AI model of an electronic device according to one or more embodiments; and FIG. 8 is a flow diagram that illustrates a method for inferencing the diffusion-based generative AI model according to the embodiment as disclosed herein.

Figure 1B:
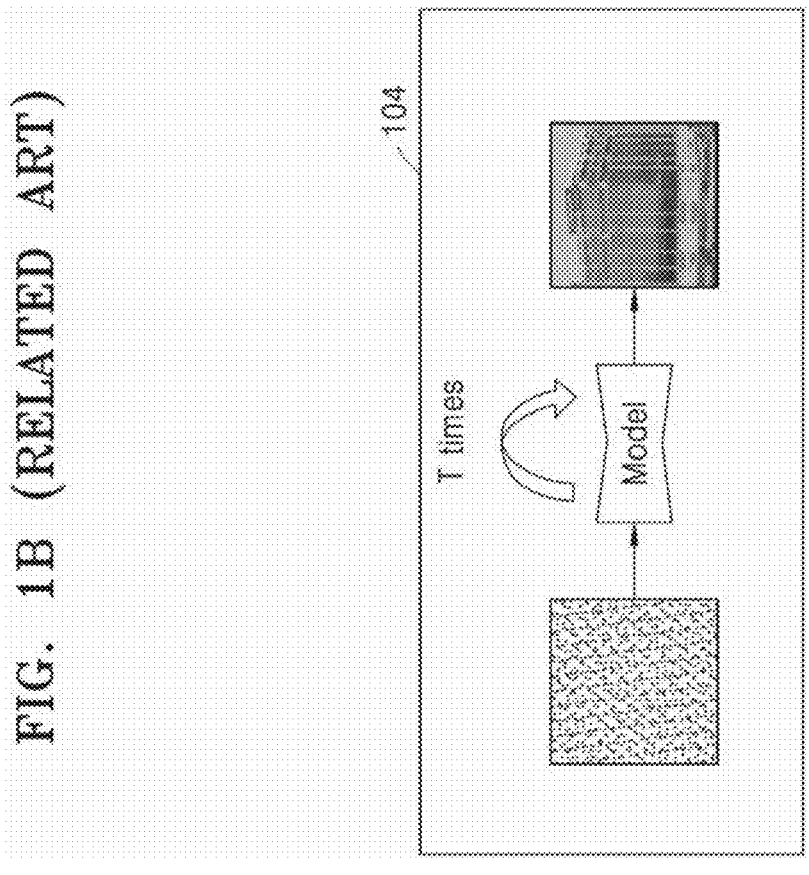
FIG. 1B is a block diagram that illustrates a general schematic diagram of a diffusion model of related art.

It is noted that to the extent possible, like reference numerals have been used to represent like elements in the drawing. Further, those of ordinary skill in the art will appreciate that elements in the drawing are illustrated for simplicity and may not have been necessarily drawn to scale. For example, the dimension of some of the elements in the drawing is exaggerated relative to other elements to help to improve the understanding of aspects of the invention. Furthermore, the elements may have been represented in the drawing by conventional symbols, and the drawings may show only those specific details that are pertinent to the understanding the embodiments of the invention so as not to obscure the drawing with details that will be readily apparent to those of ordinary skill in the art having benefit of the description herein.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and method techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples are not be construed as limiting the scope of the embodiments herein.

As is traditional in the field, embodiments are described and illustrated in terms of blocks that carry out a described function or functions. These blocks, which referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and optionally be driven by firmware and software. The circuits, for example, be embodied in one or more semiconductor chips, or on substrate supports such as printed circuit boards and the like. The circuits constituting a block be implemented by dedicated hardware, or by a processor (e.g., one or more programmed microprocessors and associated circuitry), or by a combination of dedicated hardware to perform some functions of the block and a processor to perform other functions of the block. Each block of the embodiments be physically separated into two or more interacting and discrete blocks without departing from the scope of the proposed method. Likewise, the blocks of the embodiments be physically combined into more complex blocks without departing from the scope of the proposed method.

The accompanying drawings are used to help easily understand various technical features and it is understood that the embodiments presented herein are not limited by the accompanying drawings. As such, the proposed method is construed to extend to any alterations, equivalents and substitutes in addition to those which are particularly set out in the accompanying drawings. Although the terms first, second, etc. used herein to describe various elements, these elements are not be limited by these terms. These terms are generally used to distinguish one element from another.

It should be appreciated that the blocks in each flowchart and combinations of the flowcharts may be performed by one or more computer programs which include computer-executable instructions. The entirety of the one or more computer programs may be stored in a single memory or the one or more computer programs may be divided with different portions stored in different multiple memories.

Latent diffusion models (LDMs) are often costly in terms of both computational resources and data requirements. For instance, training such models can demand up to 150,000 hours and require datasets as large as 2 TB, such as the LAION dataset. These demands make it challenging to deploy the LDM models efficiently, especially in commercial applications where resource constraints are a significant consideration.

The proposed solution circumvents the need for training a foundational LDM model by predicting intermediate latent variables based on a learning technique. The proposed solution may allow the execution of denoising methods at specific timestamps, ensuring that it maintains the quality of the output while significantly improving performance. By focusing on intermediate latent predictions, the proposed solution reduces the computational overhead and accelerates the overall method, making it more feasible for real-world applications.

The operations described below as being performed by the LDM controller (308) may also be performed by the at least one processor (302) or a combination of the at least one processor (302) and the LDM controller (308).

The LDM controller (308) comprises hardware, such as at least one processor including processing circuitry. As used herein, the "at least one processor" may or may not be the same as the processor (308). If the processor (302) and the LDM controller (308) are the same, the processor (308) and the LDM controller (308) may be integrated as a single component.

Embodiments herein can reduce the number of denoising operations taken by a diffusion based generative AI model of an electronic device to achieve or generate the final content. This can be achieved by using a lightweight operation-distillation adapter on the LDM.

Embodiments herein train the lightweight adapter to determine a number of denoising operations to achieve the final content. The lightweight adapter may determine the number of denoising operations based on the type of application (for example, text-to-image, wallpaper generation, object removal) of the input content.

Embodiments herein select a task-specific or suitable lightweight adapter from a plurality of lightweight adapters based on the type of application.

Embodiments herein introduce an interlocked reverse pass in which the task-specific lightweight adapter and the denoising U-Net of the AI model may simultaneously perform the denoising operation alongside each other. The number of operations/iterations performed by the lightweight adapter are higher that the number of operations/iterations performed by the denoising U-Net.

Embodiments herein implement each denoising operation on certain time stamps/time operations based on the latent vectors predicted by the lightweight adapter. The latent vectors is predicted without performing a denoising for all the operations.

FIGS. 1 through 8 show embodiments where similar reference characters denote corresponding features consistently throughout the figures.

FIG. 1A is a block diagram that illustrates an example of markov chain (102) as diffusion, according to the related art. The markov chain (102) for a diffusion method involves generating samples by gradually adding noise to a data distribution until it becomes a simple, noise-dominated distribution, and then reversing the method to generate new data samples from the noise. For instance, the markov chain (102) may include a forward method and a reverse method. In the forward method, noise is added to the input data (for example, image, speech) to transform it into a Gaussian noise. In the reverse method, the noise is removed operation-by-operation to transform Gaussian noise back into data samples.

FIG. 1B is a block diagrams that illustrate a general schematic diagram of a diffusion model (104), according to the related art. The diffusion model (104) generates high-dimensional data from noise using the markov chain (102). In contrast to the LDM which runs the diffusion method in the latent space, the diffusion model (104) runs it in the pixel space, which makes the training cost lower and inference speed faster. The majority of a picture's components contribute to perceptual details, and even after intensive compression, the semantic and conceptual composition of the image persists, which inspired the LDM. The LDM uses generative modelling learning to loosely partition perceptual and semantic compression. It does this by using an auto encoder to remove pixel-level duplication before using a diffusion method to alter and produce semantic ideas based on latent learning. The LDM produces multi-dimensional, realistic data, such as photorealistic speech, photos, and videos. However, because of the Markov chain method in LDM, diffusion is recurring in nature and occurs frequently. In on-device settings, this leads to an increase in inference time.

Figure 2:
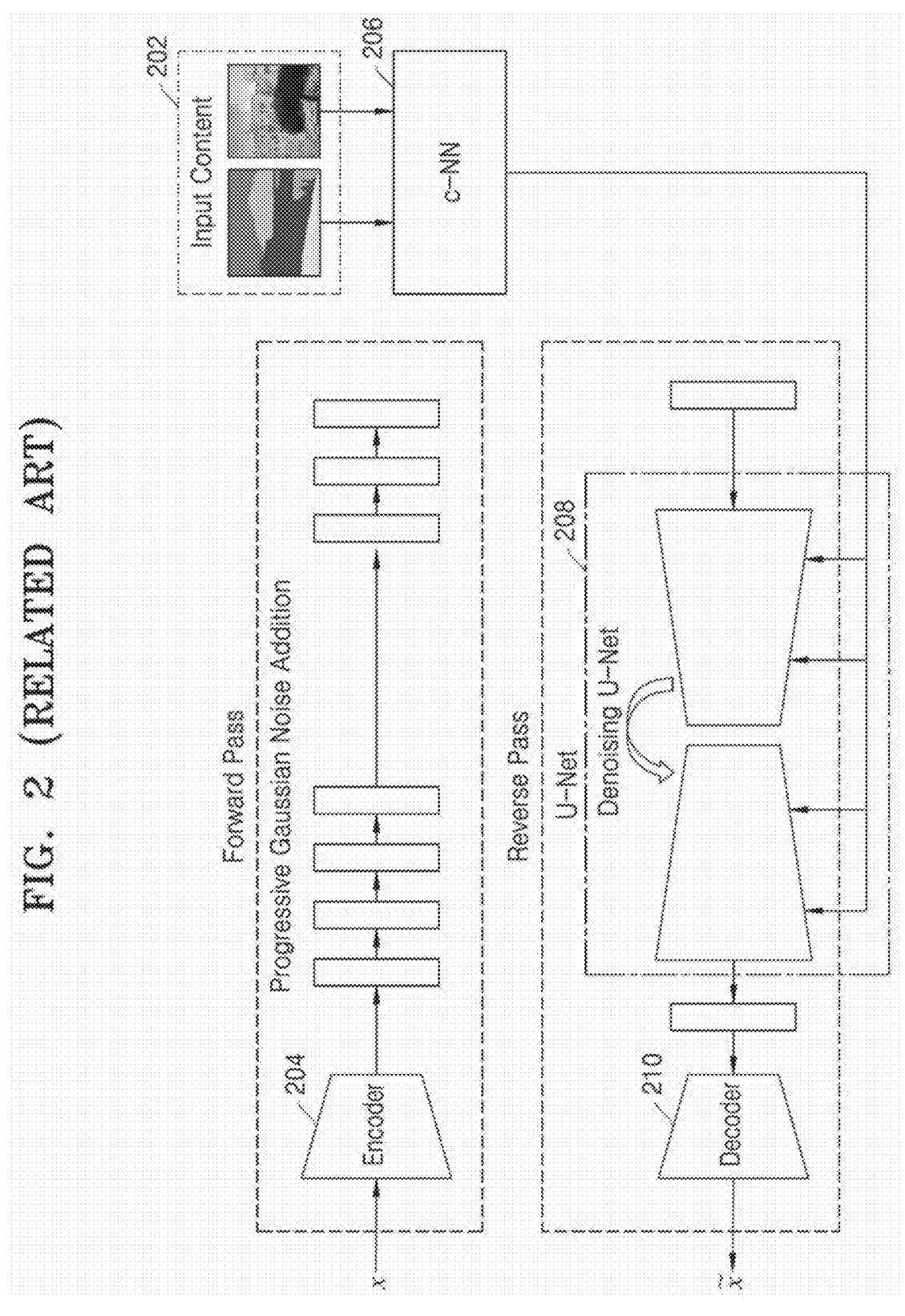
FIG. 2 is a block diagram that illustrates a latent diffusion model (LDM) of related art.

FIG. 2 is a block diagram that illustrates a latent diffusion model (LDM), according to the related art. As shown, the LDM includes an input content (202), an encoder (204), a conditional neural network (c-NN) (206), a denoising U-Net (208), and a decoder (210). The encoder (204) generates Gaussian noisy content based on the input content (202) received and converts the input content (202) into latent. The c-NN (206) may assist or train the denoising U-Net (208) to provide a conditional criterion for the denoising U-Net (208). The denoising U-Net (208) receives the latent and performs a denoising operation to denoise the noisy content to generate a denoised content. Further, the decoder (210) receives the denoised content and decodes it to generate the final content output.

A denoising U-Net (208) is a type of neural network (i.e. U-Net) designed to remove noise from images. Denoising U-Net (208) features a U-shaped architecture with an encoder-decoder structure, where the encoder progressively downsamples the input image to capture high-level features, and the decoder upsamples these features to reconstruct the image. Denoising U-Net (208) utilizes skip connections between corresponding layers of the encoder (or, contracting path) and decoder (or, expanding path) to preserve spatial information and details from the input image. In the context of diffusion models, denoising U-Net (208) may be employed to iteratively refine noisy images, progressively reducing the noise at each step to generate clear, high-quality images. Denoising U-Net(208) may be effective in various denoising tasks due to its ability to capture both local and global image features while maintaining the integrity of the original image content. Denoising U-Net(208) can have the same meaning as commonly understood by one of ordinary skill in the art described herein.

Once Gaussian noise is applied, there are a lot of denoising stages required in the current art to get the desired end content or image. For instance, it is required to do up to 15-50 denoising operations. The method of producing the final content may take longer and cost more money when there are more methods involved (denoising operations). The diffusion method may be time-consuming since LDMs occasionally goes through several iterations in order to produce the desired final content. Optimal distillation or truncation is used to reduce the number of denoising operations. However, around one billion plus parameters make up large language model/large vision models used for optimal distillation/truncation. Thus, a single type of storage requires a large amount of storage (e.g. several gigabytes (GBs)) and consumes a high amount of space.

In the proposed solution, multiple lightweight adapters are introduced that are placed alongside the denoising U-Net (208). The lightweight adapters are trained to perform the denoising operation based on the use case of the input content. One or more task-specific adapters from the multiple lightweight adapters are chosen based on the use case of the input content. The lightweight adapters are capable in generating the final content or final image within 5-8 denoising operations performed by the denoising U-Net (208). The remaining denoising operations are implemented by the denoising U-Net (208). The lightweight adapter(s) is capable of predicting the latents without performing a denoising for all operations. The denoising operations are implemented on certain time stamps based on the latent predicted to generate the next operation vectors, which are then decoded by the decoder to generate the final content or final image. The lightweight adapter(s) once trained is used for different U-Net denoising operations based on the requirement of use-case key performance indicator (KPI). Once the lightweight adapters are trained, no re-training is required for different U-Net runs.

The suggested technique takes less time to complete the denoising operation when latent vectors are predicted since denoising is only done at the necessary phases rather than at every operation. Without compromising overall accuracy, the lightweight adapter is trained to avoid the heavy lift U-Net iterations. This will result in about three times quicker performance than current diffusion models, even without changing the underlying model. Also, the latency of the current diffusion models is reduced up to 200%.

Figure 3:
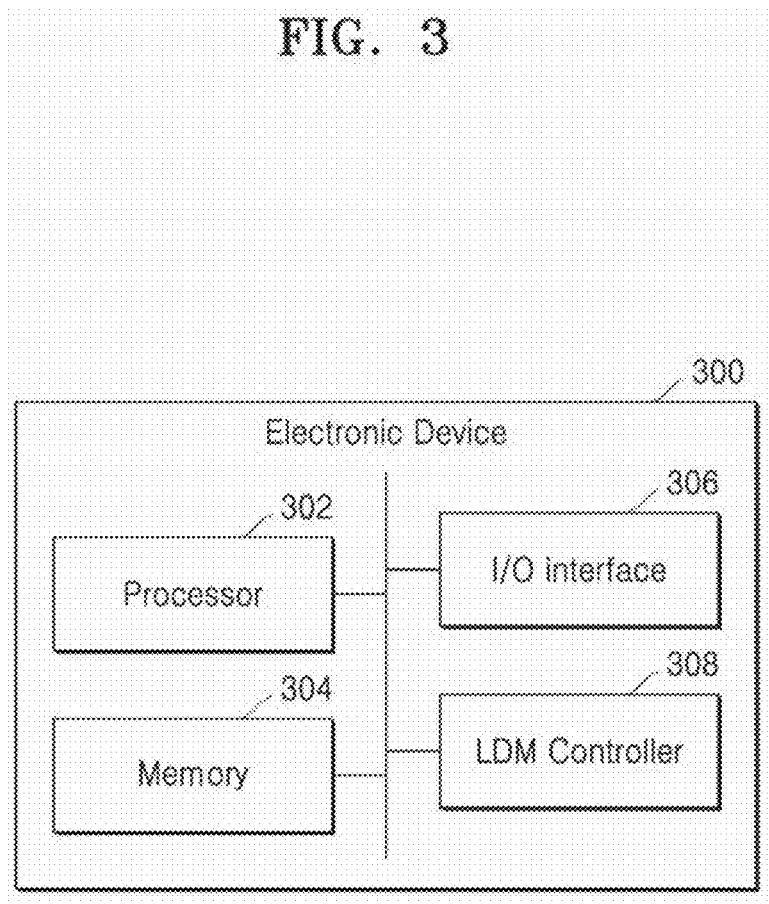
FIG. 3 is a block diagram that illustrates a schematic of an electronic device according to one or more embodiments.

FIG. 3 is a block diagram that illustrates a schematic of an electronic device (300) implemented to carry out the disclosed subject matter, according to the embodiment as disclosed herein. As shown, the electronic device (300) includes at least one processor (302), at least one memory (304), an I/O interface (306), and an LDM controller (308). For example, the electronic device (300) may include, but not limited to a personal computer (PC), desktop, laptop, smartphones, camera, and the like.

The at least one processor (302) communicates with the at least one memory (304), the I/O interface (306), and the LDM controller (308). The at least one processor (302) is configured to implement instructions stored in the memory (304) and to perform various methods. The at least one processor (302) may include one or a plurality of processors. It is a general-purpose processor such as a central processing unit (CPU), an application processor (AP), or the like, a graphics-only processing unit such as a graphics processing unit (GPU), a visual processing unit (VPU), and/or an Artificial Intelligence (AI) dedicated processor such as a neural processing unit (NPU).

The electronic device (300) has at least one memory (304) that is accessed through the at least one processor (302). The at least one memory (304) is not restricted to volatile or non-volatile memory and may consist of one or more computer-readable storage media. Further, the at least one memory (304) may contain non-volatile storage elements such as magnetic hard discs, optical discs, floppy discs, flash memories, EPROM, or EEPROM memories.

The I/O interface (306) transmits information between the at least one memory (304) and external peripheral devices.

The peripheral devices are the input-output devices associated with the electronic device (300). Furthermore, the LDM controller (308) communicates with the I/O interface (306) and the at least one memory (304). The LDM controller (308) is a hardware that is realized through the physical implementation of at least one of analog and digital circuits including logic gates, integrated circuits, microcontrollers, memory circuits, passive and active electronic components, and optical components.

Using the encoder (204), the LDM controller (308) obtains (e.g. generate, create) latent vectors from an input noisy content. The noisy content as an input is a part of the first application type among the many applications that are accessible in the electronic device (300). In an embodiment, the latent vectors are input by the LDM controller (308) into the first lightweight adapter, which is set up for the first kind of application. Every lightweight adapter has a unique configuration for a variety of uses. In an embodiment, the first lightweight adapter is used by the LDM controller (308) to convert (e.g. transform) the latent vectors of the input noisy content into the intermediate latent vectors. The final content of the first application type is closer to the intermediate latent vectors. In an embodiment, the LDM controller uses the denoising U-Net (208) to carry out a denoising operation that converts (e.g. transforms) each intermediate latent vector into next operation vectors. Furthermore, by employing a decoder (210) to decode the next operation vectors, the LDM controller (308) obtains (e.g. generates, produces) a final piece of content that falls within the first category of application.

Figure 4:
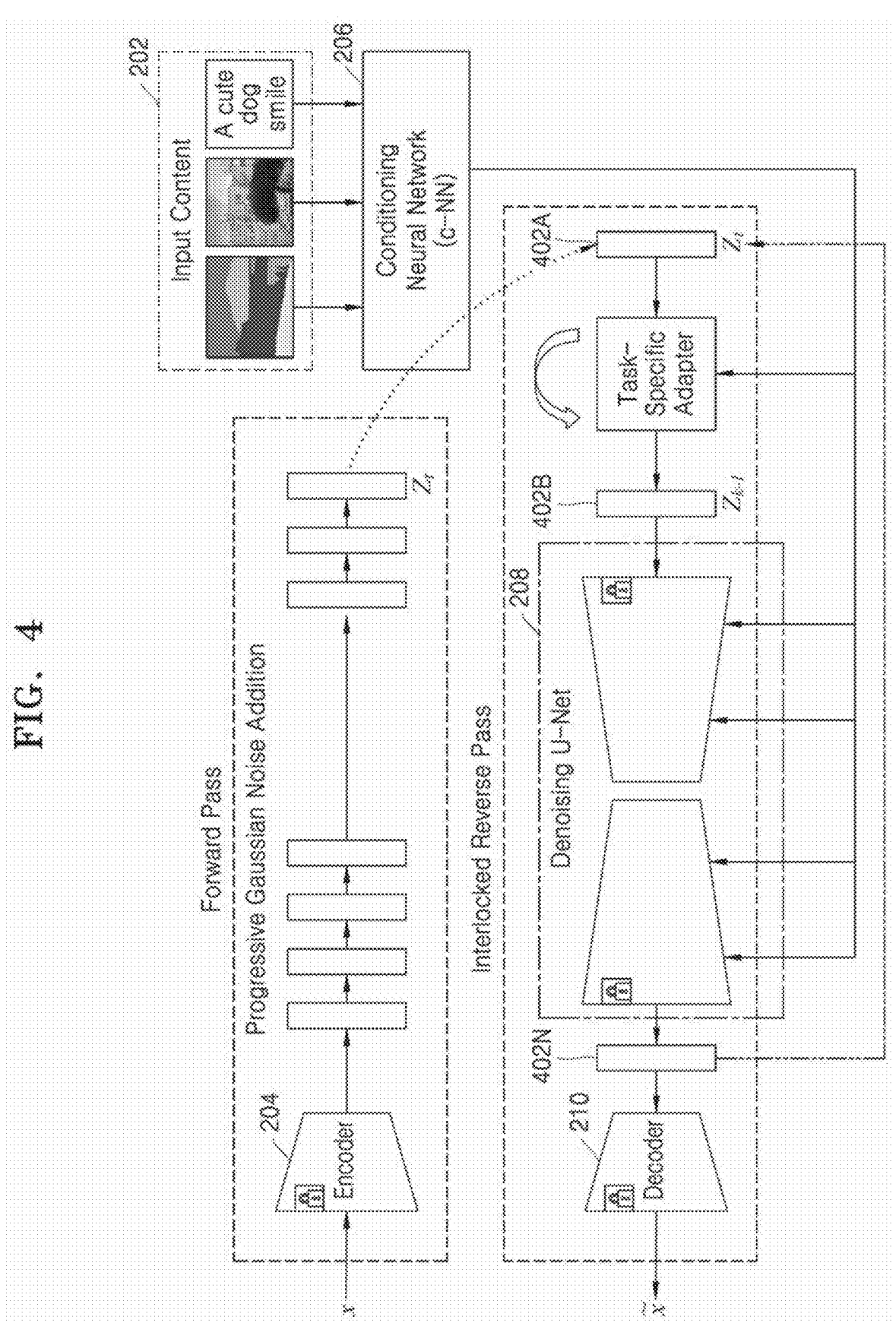
FIG. 4 is a block diagram that illustrates an exploded view of an LDM controller of the electronic device of FIG. 3 according to one or more embodiments.

FIG. 4 is a block diagram that illustrates an exploded view of the LDM controller (308) of the electronic device (300) of FIG. 3 according to the embodiment as disclosed herein. As shown, the LDM controller (308) may be divided into two regions, which are the forward pass and the interlocked reverse pass. The input content (202) may be provided by a user. For example, the input content (202) may include, but is not limited to, a text-to-image conversion command, wallpaper generation, object removal, super resolution, inpainting, outpainting, and the like.

Text-to-image conversion is a method that involves generating images based on textual descriptions. For example, the input text might be "Blue color butterfly," "Skyscraper in night view of a metropolitan city," "Generate an image of a house," and the like. The wallpaper generation is a method that involves generating custom wallpapers based on a wide variety of wallpaper designs, ranging from simple patterns and gradients to complex images based on user input. Object removal is a method that involves the removal of unwanted objects or elements from a photograph or image. This method typically involves replacing the area occupied by the object with content that blends seamlessly with the surrounding background, making it appear as if the object was never there. Super resolution is a method that involves enhancing the resolution of an image. This method involves increasing the number of pixels in an image to improve its clarity and detail, making a low-resolution image appear higher in quality.

In an embodiment, once the input content (202) is provided, the encoder (204) transforms the input content (202) into input noisy content. The input noisy content may belong to a first type of application from multiple applications available in the electronic device (300). For example, the multiple applications may include, but is not limited to, a wallpaper generation application, an object removal application, a super resolution application, a text-to-image application, an inpainting application, an outpainting application, and the like. The encoder (204) generates latent vectors corresponding to the input noisy content.

The input noisy content is generated by providing Gaussian noise addition at different time stamps. Gaussian noise is a type of statistical noise with a probability density function (PDF) equal to that of the normal distribution. The encoder (204) may generate the Gaussian noise by producing noise values that follow a Gaussian distribution with a set of mean and standard deviation values. Further, the encoder (204) may also generate different Gaussian noise levels based on the application of the input content (202). For example, the Gaussian noise levels for the super resolution application are greater when compared to the object removal application.

Further, the encoder (204) determines or predicts latent vectors of the input content (202) based on a set of training data using the c-NN (206). Latent vectors may represent a compressed version of the data in which the essential features of the input content (202) are captured in a compact form. The set of training data may refer to a dataset used to train the encoder (204) to generate latent vectors. The dataset may correspond to latent vectors generated for previous contents associated with each application of the multiple applications. The encoder (204) will be able to encode the input content (202) into the latent space Gaussian noise, which may be added to the input content (202) to generate the input noisy content prior to performing the denoising operations. The latent vectors generated in the forward pass are then provided as an input to the interlocked reverse pass. The interlocked reverse pass includes a plurality of lightweight adapters (402A, 402B, . . . , 402N), the denoising U-Net (208), and the decoder (210). For example, the plurality of lightweight adapters (402A, 420B, . . . , 402N) may be referred to as a plug-and-play neural network.

The interlocked reverse pass is responsible for refining and denoising the latent vectors obtained from the Gaussian noise added to the input content (202). The lightweight adapters (402A, 402B, . . . , 402N) act as intermediary modules that adapt the latent vectors to the specific requirements of the denoising U-Net (208). These adapters ensure that the latent vectors are in the optimal form for the denoising method, thereby enhancing the efficiency and accuracy of the denoising U-Net (208). The denoising U-Net (208) then uses the adapted latent vectors to remove the Gaussian noise introduced during the forward pass. This restores the latent vectors to a cleaner state, retaining the essential features of the input content (202) while reducing (e.g. removing, eliminating) the noise.

Finally, the decoder (210) takes the denoised latent vectors and obtains (e.g. generates, reconstructs) the final output content. The decoder (210) translates (e.g. converts, transforms) the latent vectors back into a human-readable or viewable form, such as an image or text. This reconstruction method involves mapping the latent vectors to the output space, ensuring that the final output reflects the original input content (202) provided by the user. The combination of the forward pass and the interlocked reverse pass within the LDM controller (308) enables the electronic device (300) to perform complex tasks such as text-to-image conversion, wallpaper generation, object removal, super resolution, inpainting, and outpainting with high precision and efficiency.

In an embodiment, the plurality of lightweight adapters (402A, 402B, . . . , 402N) is configured individually for each application type. For instance, a first lightweight adapter (402A) is configured for the wallpaper generation application, a second lightweight adapter (402B) is configured for the object removal application, a third lightweight adapter (402C) is configured for the super resolution application, a fourth lightweight adapter (402D) is configured for the text to image application, and the like. Thus, the electronic device (300) is capable of determining (e.g. identifying) at least one lightweight adapter of the plurality of lightweight adapters (402A, 402B, . . . , 402N) based on the use case or application of the input content (202). For example, if the application is wallpaper generation, then the first lightweight adapter (402A) is chosen. The plurality of lightweight adapters (402A, 402B, . . . , 402N) are trained for each type of application, and the denoising operation is the same for each type of application as well. The training method is explained in further detail in FIG. 8.

In an embodiment, the at least one lightweight adapter chosen/determined based on the application of the input content (202) transforms the latent vectors of the input content (202) into intermediate latent vectors. The at least one lightweight adapter may rotate or scale the latent vectors in such a manner that the number of denoising operations gets reduced. The intermediate latent vectors are closer to a final content belonging to the type of application associated with the input content (202). The intermediate latent vectors are determined using a normalization non-linear regression method. The normalization non-linear regression method is explained in further detail in FIG. 6.

In an embodiment, the denoising U-Net (208) performs the denoising operation to transform each intermediate latent vector into next operation vectors. The denoising operation may involve rotating and scaling the latent vectors in order to make them aligned with each other. The LDM controller (308) is capable of predicting the number of denoising operations to be performed by the denoising U-Net (208) to remove noise from the input noisy content. The denoising U-Net (208) is trained to determine the number of denoising operations based on the use case of the at least one application of the multiple applications that corresponds to the input content (202). For example, the number of denoising operations for the super resolution application is 5, the number of denoising operations for the inpainting application is 4, and the like. The number of denoising operations is tunable and is tuned based on the use case. Once the number of denoising operations is determined, the next operation vectors are obtained using a vector transformation method. The vector transformation method is explained in further detail in FIG. 6.

In an embodiment, the decoder (210) generates the final content based on the input content (202) received by decoding the next operation vectors. The decoder (210) may generate the final content by first sampling the next operation vectors from the Gaussian distribution. The purpose of sampling the next operation vectors is to ensure that the reconstructed content has less reconstruction loss and matches with the expected output of the input content (202). The decoder (210) may include a generator and a discriminator. Once the next operation vectors are sampled, the generator takes each next operation vector and generates data. The discriminator then distinguishes between the generated data and the actual expected data corresponding to the input content (202). If there is a match, this indicates that the input content (202) provided has been successfully decoded to generate the final content or the final image.

Further, the system may incorporate a user interface that allows users to provide input and adjust various parameters of the lightweight adapters and the denoising U-Net. This user interface can provide real-time previews of the generated content, enabling users to make adjustments and see the effects immediately. This interactive approach may enhances user experience. In an embodiment, this interactive approach may allow a greater customization and fine-tuning of the final content based on user preferences. The user interface may include options for saving and exporting the generated content in various formats, making it convenient for users to utilize the content in different applications and platforms.

Figure 5:
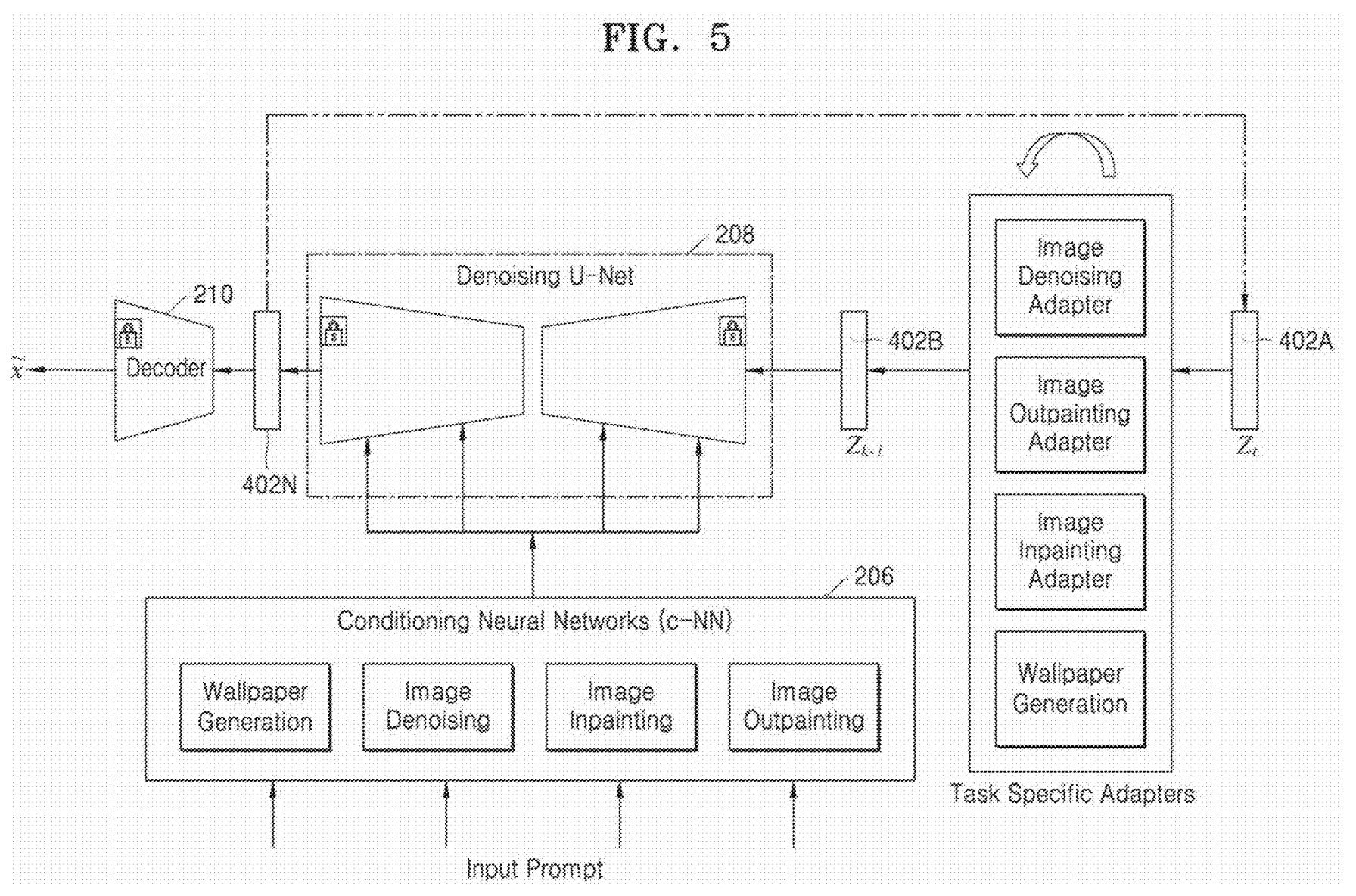

FIG. 5 is a block diagram that illustrates a view of a task-specific adapter of the LDM controller (308) of the electronic device (300) of FIG. 4 according to the embodiment herein. The task-specific adapter may include, but is not limited to, an image denoising adapter, image outpainting adapter, image inpainting adapter, wallpaper generation, and the like. For each application or use case, a separate lightweight adapter is assigned. Different adapters are used for different operations. In an embodiment, the load share between the denoising U-Net (208) and the plurality of lightweight adapters (402A-N) may be in the ratio of 1:9.

In an embodiment, an additional request may be placed to add one or more new applications to the applications currently available. The new applications may correspond to applications that are not supported or fully supported by the diffusion-based generative AI model. The diffusion-based generative AI model may then be capable of assigning or adding at least one new lightweight adapter to the plurality of lightweight adapters (402A, 402B, . . . , 402N) currently available based on the one or more new applications received. For instance, more than one new lightweight adapter is added based on the complexity of the new application(s). Once the one or more new lightweight adapters are added, the diffusion-based generative AI model trains each new lightweight adapter. The training of the new lightweight adapters is explained in further detail in FIG. 7.

The method of adding new lightweight adapters involves several operations to ensure seamless integration and functionality. In an embodiment, the system assesses the requirements of the new application to determine the specific functionalities to use. In an embodiment, the system identifies the appropriate lightweight adapter or combination of adapters that can handle the new tasks based on the assessment. The identification method may involve analyzing the computational load, memory requirements, and compatibility with existing adapters. Once identified, the new lightweight adapters may be instantiated and integrated into the LDM controller (308). The integration ensures that the new adapters may communicate effectively with the existing system components, including the denoising U-Net (208) and other lightweight adapters (402A, 402B, . . . , 402N).

After integration, the training phase begins, where the diffusion-based generative AI model fine-tunes each new lightweight adapter. The training involves feeding the new adapters with relevant data sets that correspond to the new application's requirements. The training method ensures that the new adapters may perform their designated tasks with high accuracy and efficiency. During this phase, the system may also perform validation checks to ensure (e.g. identify, check, determine) that the new adapters do not interfere with the performance of existing adapters. Once the training and validation are complete, the new lightweight adapters may become fully operational, ready to handle their specific tasks within the broader framework of the electronic device (300). The modular approach may allow continuous expansion and enhancement of the system's capabilities, ensuring it can adapt to new applications and technological advancements.

Figure 6:
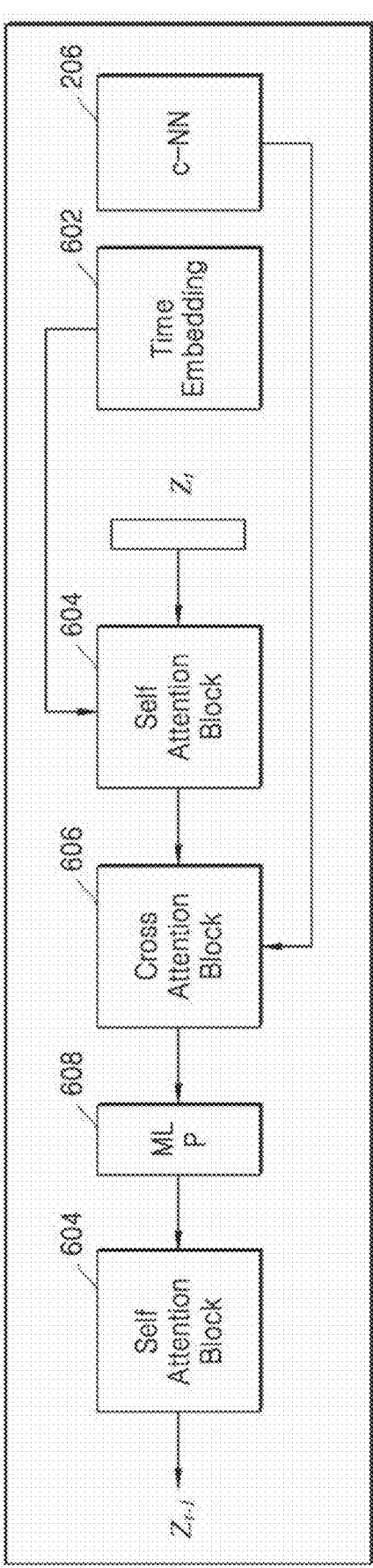
FIG. 6 is a block diagram that illustrates an exploded view of a first lightweight adapter of the LDM controller of the electronic device of FIG. 4 according to one or more embodiments.

FIG. 6 is a block diagram that illustrates an exploded view of a first lightweight adapter (402A) of the LDM controller (308) of the electronic device (300) of FIG. 4 according to the embodiment herein. As shown, the first lightweight adapter (402A) includes the c-NN (206), a time embedding (602), a self-attention block (604), a cross-attention block (606), and an MLF (608). The other lightweight adapters (402B, . . . , 402N) may also include the same components as the first lightweight adapter (402A) and perform similar functionalities. Each component is explained in further detail below.

In an embodiment, the time embedding (602) is a technique that involves representing temporal information in a continuous vector space. The latent vectors are collected at regular time intervals by the first lightweight adapter (402A). The time embedding (602) allows these latent vectors to be transformed into numerical representations that capture the temporal relationships between them. This transformation may involve encoding time-related features such as timestamps or time intervals into a lower-dimensional vector space. The c-NN (206), which is in communication with the first lightweight adapter (402A), is capable of learning how to jump from time operation i to i+n. The time embedding (602) is taken into account as a conditioning of feature prediction.

In an embodiment, the self-attention block (604) transforms the latent vectors of the input content (202) into intermediate latent vectors. The self-attention block (604) first determines a query vector, a key vector, and a value vector of the latent vectors of the input content (202). The query vector is used to determine a similarity between elements of the input content (202). The key vector is used to compute how relevant each element in the input content (202) is to the query. Further, the value vector is used to store information used to update the representation of the query. The query vector, key vector, and value vectors are each determined using learned weight matrices.

The self-attention block (604) then performs a normalization non-linear regression method on the query vector, the key vector, and the value vector to obtain the intermediate latent vectors. For each query vector, a dot product with each key vector is determined to obtain an attention score. The attention score is a measure that may indicate how much focus should be given for each latent vector generated via the encoder (204). The attention score is scaled up by the square root of the dimension of the key vectors to maintain stable gradients and then passed through a softmax function to obtain the attention weights. Each output vector is a weighted sum of the value vectors, where the weights are the attention weights obtained previously. This results in the transformation of the vectors into intermediate latent vectors.

In an embodiment, the cross-attention block (606) performs a vector transformation method to obtain the next operation vectors by transforming each intermediate latent vector determined by the self-attention block (604). The cross-attention block (606) first determines a key vector and a value vector of each intermediate latent vector. The cross-attention block (606) then performs a weighted sum method on the key vector and the value vector. In the weighted sum method, the attention weights of the key vector and the value vector are determined by using a softmax function. Once the attention weights are determined, the weighted sum of the key vector and the value vector is determined, where the output vectors are computed as a weighted sum of the value vectors. This results in the transformation of the vectors into next operation vectors.

In addition to the aforementioned components, the first lightweight adapter (402A) also includes the MLF (608), which stands for Multi-Layer Feedforward network. The MLF (608) is responsible for processing the next operation vectors obtained from the cross-attention block (606). It may include multiple layers of neurons, where each layer applies a linear transformation followed by a non-linear activation function to the input vectors. The MLF (608) enhances the representational capacity of the model by enabling it to obtain (e.g. capture) complex patterns and relationships within the data. After the final processing operation, the output vectors may be well-suited for subsequent tasks, such as classification, regression, or other forms of prediction.

The described architecture of the first lightweight adapter (402A) exemplifies a sophisticated approach to handling temporal data and noisy inputs within the LDM controller (308) of the electronic device (300). By leveraging techniques such as time embedding, self-attention, and cross-attention, the system can effectively learn and represent temporal dependencies and relationships within the data. The modular design may allow for scalability and adaptability, as additional lightweight adapters (402B, . . . , 402N) may be incorporated to handle different types of data or to enhance the overall performance of the system. Each component ensures that the final output vectors are accurate, robust, and ready for further processing or decision-making tasks.

FIGS. 7A-7B are flow diagrams that illustrate a method for training a diffusion-based generative AI model of an electronic device according to the embodiment as disclosed herein. The method comprises operations (702-726). Each operation is explained in detail below.

At operation (702), latent vectors of an input content (202) are generated (e.g. obtained) using an encoder (204) of the LDM controller (308) of the electronic device (300). The input content (202) may belong to a first type of application from among multiple applications in the electronic device (300). For example, the applications may include but not be limited to a wallpaper generation application, an object removal application, a super resolution application, an inpainting application, an outpainting application, and the like. The encoder (204) generates (e.g. obtains) latent vectors corresponding to the input content (202).

These latent vectors serve as a compressed representation of the input data, encapsulating the essential features of the content while reducing its dimensionality. This transformation into latent vectors is used for the subsequent processing operations, as it allows the system to handle complex data more efficiently. The encoder (204) may utilize advanced techniques to ensure (e.g. determine, check) that the latent vectors retain the information for the specific application, whether it is enhancing image resolution, removing unwanted objects, or generating new images from textual descriptions. By doing so, the encoder (204) may facilitate the effective manipulation and improvement of the input content (202) within the electronic device (300).

At operation (704), a Gaussian noise is added (i.e. a Gaussian noise addition is provided) to obtain (e.g. generate) an input noisy content associated with the input content (202) obtained in operation (702). One way to obtain the input noisy content is to add Gaussian noise at various time stamps. For instance, a random number may be sampled to get the time stamp and the Gaussian noise is associated with this time stamp. A kind of statistical noise known as Gaussian noise has a probability density function (PDF) that is equivalent to the normal distribution. The noise values generated may adhere to a Gaussian distribution with a set of mean and standard deviation values. Further, depending on how the input content (202) is applied, the encoder (204) may produce various Gaussian noise levels. For instance, compared to the object removal application, the Gaussian noise levels for the super resolution application may be higher.

The method of adding Gaussian noise is integral to simulating real-world conditions where data is often imperfect and noisy. This operation ensures that the system is robust and capable of handling a wide range of input scenarios. By adjusting the noise levels according to the specific application, the encoder (204) may fine-tune its performance to achieve optimal results. For example, higher noise levels in super resolution applications may help the system learn to enhance finer details, while lower noise levels in object removal applications may focus on preserving the overall integrity of the image. This adaptability makes the encoder (204) a versatile tool in the LDM controller (308).

At operation (706), the latent vectors of the input content (202) may be determined based on a set of training data using the c-NN (206) or the encoder (204). Latent vectors may represent a condensed representation of the input data, encapsulating the key elements of the input content (202) in a manageable format. A dataset used to train the plurality of lightweight adapters (402A-N) to produce latent vectors may be referred to as the "set of training data." The latent vectors generated for each of the associated past contents from several applications may be correlated with the dataset. The encoder (204) will be able to provide the proper latent vectors for the denoising operations by encoding the input content (202) into the latent space using the training data.

The training data may determine (e.g. shape) the ability of the encoder (204) to generate accurate latent vectors. This data comprises a diverse collection of examples that represent the various types of noisy content the system might encounter. By learning from this comprehensive dataset, the encoder (204) may generalize its knowledge to new, unseen inputs, ensuring consistent performance across different applications. The c-NN (206) may leverage this training data to refine the latent vectors, making them more precise and effective for subsequent denoising methods. This iterative learning method may enhance the overall capability of the LDM controller (308), enabling it to deliver high-quality results regardless of the input content's initial noise levels.

At operation (708), the latent vectors obtained at operation (706) are provided as an input to a first lightweight adapter (402A) configured for the first application type from among a plurality of lightweight adapters (402A, 402B, . . . , 402N) configured individually for application types of the plurality of applications. Depending on the use case or application of the input content (202), the electronic device (300) may identify the plurality of lightweight adapters (402A, 402B, . . . , 402N). Further, the plurality of lightweight adapters (402A, 402B, . . . , 402N) are trained for every application type, and the denoising method is the same for all application types. This modular approach may allow the system to efficiently handle different types of input content by leveraging specialized adapters that are fine-tuned for specific applications. By doing so, the system ensures that the latent vectors are handled in a manner that is most suitable for the type of content being handled, thereby improving the overall accuracy and effectiveness of the denoising method.

At operation (710), the first lightweight adapter (402A) or any other lightweight adapter of the plurality of lightweight adapters (402A, 402B, . . . , 402N) chosen/determined based on the application of the input content (202) transforms (e.g. converts) the latent vectors of the input content (202) into intermediate latent vectors. The intermediate latent vectors may be closer to a final content belonging to the type of application associated with the input content (202). The intermediate latent vectors may be determined using a normalization non-linear regression method. This transformation may move (bring) the noisy input vectors closer to their intended clean state, making it easier for subsequent processing stages to refine and finalize the content. The normalization non-linear regression method may play a role in this transformation by adjusting the vectors in a way that accounts for the specific characteristics and requirements of the application type, thereby ensuring that the intermediate vectors are well-aligned with the expected output.

At operation (712), a query vector, a key vector, and a value vector of the latent vectors of the input content (202) are initially identified in the normalizing non-linear regression procedure. The similarity between components of the input content (202) may be ascertained using the query vector. The relevance of each element in the noisy content input to the query may be determined based on the key vector. Further, data to change the query's representation may be stored in the value vector. Weight matrices that have been trained may be used to determine the query, key, and value vectors. This operation may be essential for understanding the relationships and dependencies within the noisy content, allowing the system to focus on the most relevant parts of the input. By leveraging the query, key, and value vectors, the system may effectively capture the underlying structure of the content, for accurate denoising and content transformation.

At operation (714), the normalizing non-linear regression procedure may then be performed on the query, key, and value vectors to get the multiplicity of intermediate latent vectors. To get an attention score, a dot product for each key vector for each query vector may be found. One metric that may help determine how much attention to devote to each latent vector produced by the encoder (204) is the attention score. To ensure stable gradients, the attention score is scaled up by the square root of the key vectors' dimensions. The attention weights may then be obtained by passing the score through a softmax function. Each output vector is a weighted sum of the value vectors, where the weights are the attention weights obtained previously. This may result in the transformation of the vectors into intermediate latent vectors. For instance, the transformation of the vectors into the intermediate latent vectors may be referred to as a first output. This attention mechanism may allow the system to selectively focus on the most important parts of the input content, thereby enhancing the quality of the intermediate latent vectors. By dynamically adjusting the attention weights, the system may ensure that the most relevant information is retained and emphasized, leading to more accurate and effective denoising and content transformation.

At operation (716), a denoising operation is performed to transform each intermediate latent vector generated at operation (706) into the next operation vectors. The denoising operation refers to the method of removing noise from the intermediate latent vectors generated at operation (706).

At operation (718), the next operation latent vectors are obtained using a vector transformation method. The vector transformation method may be explained in further detail in operation (720) and operation (722). At operation (720), a key vector and a value vector of each intermediate latent vector may be determined. The key vector is used to assess each element in the noisy content input's relevance to the query. Furthermore, the value vector may contain information that is required to modify the query's representation. To find the key and value vectors, trained weight matrices are employed. This operation is essential for ensuring that the most relevant information is retained and accurately represented in the next operation latent vectors.

At operation (722), a weighted sum method is performed on the key vector and the value vector determined in operation (720) using the first lightweight adapter (402A). A softmax function is used in the weighted sum method to compute the attention weights of the value vector and the key vector. The output vectors may be produced as a weighted sum of the value vectors once the attention weights have been established. This involves determining the weighted sum of the key and value vectors. The vectors become next operation latent vectors as a result of this transformation. For instance, the next operation latent vectors determined here may be referred to as a second output. This operation may help the next operation vectors to become a precise and accurate representation of the input content, with the noise effectively removed and the most relevant information retained.

At operation (724), the first output determined at operation (714) and the second output determined at operation (724) may be compared with each other to determine a reconstruction loss. The reconstruction loss is a measure to evaluate the difference between predicted next operation latent by the denoising U-Net (208) and the next operation latent prediction by the first lightweight adapter (402A). The reconstruction loss may be represented using a graph or using a whole number or decimal number. This representation on may clearly indicate how much the first output and the second output differ from each other.

At operation (726), the first lightweight adapter (402A) may be updated based on the reconstruction loss determined in operation (724). For instance, an adapter weight of the first lightweight adapter (402A) may be updated. Updating or tuning the weight of the first lightweight adapter (402A) is important in improving the efficiency for reducing the number of denoising operations/execution operations performed by the denoising U-Net (208) during inference.

FIG. 8 is a flow diagram that illustrates a method for inferencing the diffusion-based generative AI model according to the embodiment as disclosed herein. The method comprises operations (802-810) which are implemented using the encoder (204), the plurality of lightweight adapters (402A, 402B, . . . , 402N), and the denoising U-Net (208) of the LDM controller (308) of FIG. 3. Each block is explained in detail below.

At operation (802), a request is received (e.g. obtained) to generate an input content (202). For example, the input content (202) may include, but is not limited to, a text-to-image conversion command, wallpaper generation, object removal, super-resolution, inpainting, outpainting, and the like. This operation may initiate the method by identifying the specific type of content to be generated, which sets the stage for subsequent processing operations. The request may come from various sources, such as user commands, automated scripts, or integrated applications, and it may serve as the trigger for the generative AI model to start its operation.

At operation (804), the encoder (204) may determine a plurality of iterations (N) required to generate (e.g. obtain) the input content (202). The iterations may be determined based on the use case of the input content (202). The encoder (204) may determine the number of iterations required to generate (e.g. obtain) the final content based on a set of data. The set of data may include final contents/images of previous contents received for each application and may also include the number of iterations taken to achieve the final content/images. Also, the number of iterations may vary based on the type of application from the applications associated with the input content (202). This variation may be determined based on the complexity and data size of the input content (202). For instance, a text-to-image conversion might require fewer iterations compared to a super-resolution task due to the inherent differences in complexity and data requirements.

Following the determination of the required iterations, the method proceeds to utilize the plurality of lightweight adapters (402A, 402B, . . . , 402N) and the denoising U-Net (208) to iteratively refine the generated (e.g. obtained) content. Each iteration involves the application of these components to progressively enhance the quality and accuracy of the output. The lightweight adapters (402A, 402B, . . . , 402N) may adapt the model to different types of input content without significantly increasing computational overhead. In an embodiment, the denoising U-Net (208) is responsible for reducing noise and improving the clarity of the generated (e.g. obtained) content at each operation. This iterative method may continue until the final content meets the desired criteria, as specified in the initial request. The combination of these components may ensure that the generative AI model can produce high-quality outputs efficiently, regardless of the specific application or complexity of the input content.

At operation (806), a denoising count and an adapter count are determined based on the number of iterations determined in operation (804). The denoising count plus the adapter count may equal the number of iterations required to denoise the input noisy data. The denoising count may include the first number of iterations to be performed by the denoising U-Net (208). The adapter count may include a second number of iterations to be performed by at least one lightweight adapter of the plurality of lightweight adapters (402A, 402B, . . . , 402N). For example, the input content (202) may correspond to a wallpaper generation application. The iterations required to denoise the wallpaper once Gaussian noise is added may be 20 iterations (the number of iterations that current LDMs take in the related art). These 20 iterations may be then divided between the denoising U-Net (208) and the at least one lightweight adapter of the plurality of lightweight adapters (402A, 402B, . . . , 402N). The at least one lightweight adapter performs the denoising is 5 iterations. Thus, the first number of iterations may be equal to 15 iterations (20−5=15), which are performed by at least one lightweight adapter of the plurality of lightweight adapters (402A, 402B, . . . , 402N). The second number of iterations may be equal to 5 iterations, which are performed by the denoising U-Net (208).

At operation (808), the denoising operation and an output operation may be performed. The denoising operation may be performed for each first iteration of the first number of iterations by the denoising U-Net (208) to generate (e.g. obtain) a first output. The output operation may be performed for each second iteration of the second number of iterations by the at least one lightweight adapter of the plurality of lightweight adapters (402A, 402B, . . . , 402N) to generate (e.g. obtain) a second output. The denoising operation and the output operation may be performed in an interlocked manner or simultaneously alongside each other on the same timestamp/instance/iteration. For instance, the at least one lightweight adapter implements for a few iterations, and then the predicted latent vectors are denoised by the denoising U-Net (208). The latent vectors denoised by the denoising U-Net (208) may then be analyzed by the at least one lightweight adapter to produce or predict better latent vectors or next operation vectors. The at least one lightweight adapter of the plurality of lightweight adapters (402A, 402B, . . . , 402N) may perform the output operation by using the components explained in FIG. 6 to generate (e.g. obtain) the second output.

At operation (810), the final content may be generated (e.g. obtained) based on the input content (202) obtained by decoding the next operation vectors determined. The next operation vectors from the Gaussian distribution may be sampled by the decoder (210) before producing the final content. Sampling the next operation vectors may be done to make sure that the reconstructed content matches the predicted output of the input content (202). If a match is found, it may provide an indication that the input content (202) has been correctly decoded to produce the final content or final picture/image. This final operation may ensure that the output is not only accurate but also of high quality, closely matching the original input content.

Hence, the proposed solution provides a novel task-specific lightweight operation-distillation adapter that predicts the intermediate latent vector, significantly reducing the heavy denoising module iterations in a Latent Diffusion Model. The proposed solution approach not only optimizes the efficiency of the model but also ensures that it remains adaptable for future use-case models. By integrating this lightweight adapter, the model can maintain high performance while minimizing computational demands, making it more practical for real-world applications where resources may be limited.

The technical advancement and value of the disclosure lies in several key aspects. Firstly, it reduces the inference time of the Stable Diffusion (SD) model that can lead to faster processing times and more responsive applications. This reduction in inference time is achieved without compromising the quality of the output, ensuring that the model remains effective and reliable. Secondly, the solution framework is designed to be extensible, allowing new use-cases to be added in the future without disturbing the core foundation model. This modularity is used for the ongoing development and adaptation of the model to meet evolving needs and applications.

Further, the proposed solution may eliminate a need for resource-intensive training of knowledge distillation techniques to reduce inference time. This is particularly beneficial as it lowers the barrier to entry for deploying advanced AI models, making them more accessible to a wider range of users and developers. Further, various unique selling propositions (USPs) such as image super-resolution, image denoising, and image inpainting can be realized on-device using this novel approach. This means that high-quality image processing tasks can be performed locally on devices, enhancing privacy and reducing dependency on cloud-based services.

According to an embodiment of the disclosure, a method for generating content using a diffusion model of an electronic device, may include obtaining, by the electronic device, latent vectors of an input content using an encoder of the electronic device, wherein the input content belongs to a first application type from among a plurality of applications available in the electronic device. According to an embodiment of the disclosure, the method may include obtaining, by the electronic device, the final content belonging to the first application type by decoding the next operation vectors using a decoder of the electronic device.

According to an embodiment of the disclosure, the plurality of lightweight adapters may be trained for the application types of the plurality of applications individually and the denoising operation is trained for the application types of the plurality of applications.

According to an embodiment of the disclosure, the method further may include training, by the electronic device, the plurality of lightweight adapters, to obtain the plurality of intermediate latent vectors with the denoising U-Net.

According to an embodiment of the disclosure, training by the electronic device, the plurality of lightweight adapters, to obtain the plurality of intermediate latent vectors with the denoising U-Net may include obtaining, by the electronic device, a request to generate the input content. According to an embodiment of the disclosure, training, by the electronic device, the plurality of lightweight adapters, to obtain the plurality of intermediate latent vectors with the denoising U-Net may include determining, by the electronic device, a plurality of iterations required to obtain the input content using the encoder wherein the plurality of iterations vary based on the application types from the plurality of applications associated with the input content. According to an embodiment of the disclosure, training, by the electronic device, the plurality of lightweight adapters, to obtain the plurality of intermediate latent vectors with the denoising U-Net may include determining, by the electronic device, a denoising count indicating a first number of iterations of the plurality of iterations to be performed by the denoising U-Net, and an adapter count indicating a second number of iterations of the plurality of iterations to be performed by at least one lightweight adapter of the plurality of lightweight adapters. According to an embodiment of the disclosure, training, by the electronic device, the plurality of lightweight adapters, to obtain the plurality of intermediate latent vectors with the denoising U-Net may include performing, by the electronic device, the denoising operation for each first iteration of the first number of iterations by the denoising U-Net to obtain a first output and an output operation for each second iteration of the second number of iterations by the at least one lightweight adapter of the plurality of lightweight adapters to obtain a second output, wherein the denoising operation and the output operation are simultaneously performed. According to an embodiment of the disclosure, training, by the electronic device, the plurality of lightweight adapters, to obtain the plurality of intermediate latent vectors with the denoising U-Net may include comparing, by the electronic device, the first output and the second output to determine a reconstruction loss. According to an embodiment of the disclosure, training, by the electronic device, the plurality of lightweight adapters, to obtain the plurality of intermediate latent vectors with the denoising U-Net may include updating, by the electronic device, an adapter weight based on the reconstruction loss.

According to an embodiment of the disclosure, obtaining, by the electronic device, the latent vectors of the input content using the encoder of the electronic device may include adding, by the electronic device, a Gaussian noise to obtain an input noisy content associated with the input content. According to an embodiment of the disclosure, obtaining, by the electronic device, the latent vectors of the input content using the encoder of the electronic device may include determining, by the electronic device, the latent vectors of the input content based on a set of training data using a conditional neural network (c-NN) or the encoder.

According to an embodiment of the disclosure, transforming, by the electronic device, the latent vectors of the input content into the plurality of intermediate latent vectors using the first lightweight adapter may include: determining, by the electronic device, a query vector, a key vector, and a value vector of the latent vectors of the input content. According to an embodiment of the disclosure, transforming, by the electronic device, the latent vectors of the input content into the plurality of intermediate latent vectors using the first lightweight adapter may include performing, by the electronic device, a normalization non-linear regression method on the query vector, the key vector, and the value vector to obtain the plurality of intermediate latent vectors.

According to an embodiment of the disclosure, performing, by the electronic device, the denoising operation to transform the plurality of intermediate latent vectors into the plurality of next operation vectors using the denoising U-Net of the electronic device may include: performing, by the electronic device, a vector transformation at of a plurality of denoising time operations of the denoising operation for transforming the plurality of intermediate latent vectors.

According to an embodiment of the disclosure, performing, by the electronic device, the vector transformation at the plurality of denoising time operations of the denoising operation for transforming the plurality of intermediate latent vectors may include determining, by the electronic device, key vectors and value vectors of the plurality of intermediate latent vectors using the first lightweight adapter. According to an embodiment of the disclosure, performing, by the electronic device, the vector transformation at the plurality of denoising time operations of the denoising operation for transforming the plurality of intermediate latent vectors may include performing, by the electronic device, a weighted sum method using the first lightweight adapter on the key vectors and the value vectors based on attention weights determined to obtain the plurality of next operation vectors.

According to an embodiment of the disclosure, the method may include obtaining, by the electronic device, an addition request to add one or more new applications to the plurality of applications in the electronic device. According to an embodiment of the disclosure, the method may include adding, by the electronic device, at least one new lightweight adapter to the plurality of lightweight adapters for the one or more new applications obtained, wherein the at least one new lightweight adapter is trained for each new application of the one or more new applications.

According to an embodiment of the disclosure, the plurality of lightweight adapters may be trained for the application types of the plurality of applications individually and the denoising operation may be trained for the application types of the plurality of applications.

According to an embodiment of the disclosure, the LDM controller may be further configured to execute the instructions that cause the electronic device to train the plurality of lightweight adapters to generate the plurality of intermediate latent vectors with the denoising U-Net.

The LDM controller may be further configured to execute the instructions that cause the electronic device to obtain a request to generate the input content. The LDM controller may be further configured to execute the instructions that cause the electronic device to determine a plurality of iterations required to generate the input content using the encoder, wherein the plurality of iterations vary based on the application types from the plurality of applications associated with the input content. The LDM controller may be further configured to execute the instructions that cause the electronic device to determine a denoising count indicating a first number of iterations of the plurality of iterations to be performed by the denoising U-Net, and an adapter count indicating a second number of iterations of the plurality of iterations to be performed by at least one lightweight adapter of the plurality of lightweight adapters. The LDM controller may be further configured to execute the instructions that cause the electronic device to perform the denoising operation for each first iteration of the first number of iterations by the denoising U-Net to obtain a first output and an output operation for each second iteration of the second number of iterations by the at least one lightweight adapter of the plurality of lightweight adapters to obtain a second output, wherein the denoising operation and the output operation are simultaneously performed. The LDM controller may be further configured to execute the instructions that cause the electronic device to compare the first output and the second output to determine a reconstruction loss. The LDM controller may be further configured to execute the instructions that cause the electronic device to update an adapter weight based on the reconstruction loss.

The LDM controller may be further configured to execute the instructions that cause the electronic device to add a Gaussian noise to obtain an input noisy content associated with the input content. The LDM controller may be further configured to execute the instructions that cause the electronic device to determine the latent vectors of the input content based on a set of training data using a conditional neural network (c-NN) or the encoder.

According to an embodiment of the disclosure, the LDM controller may be further configured to execute the instructions that cause the electronic device to determine a query vector, a key vector, and a value vector of the latent vectors of the input content. The LDM controller may be further configured to execute the instructions that cause the electronic device to perform a normalization non-linear regression method on the query vector, the key vector, and the value vector to obtain the plurality of intermediate latent vectors.

According to an embodiment of the disclosure, the LDM controller may be further configured to execute the instructions that cause the electronic device to perform a vector transformation at a plurality of denoising time operations of the denoising operation for transforming the plurality of intermediate latent vectors.

According to an embodiment of the disclosure, the LDM controller may be further configured to execute the instructions that cause the electronic device to determine key vectors and value vectors of the plurality of intermediate latent vectors using the first lightweight adapter. According to an embodiment of the disclosure, the LDM controller may be further configured to execute the instructions that cause the electronic device to perform a weighted sum method using the first lightweight adapter on the key vectors and the value vectors to obtain the plurality of next operation vectors.

According to an embodiment of the disclosure, the LDM controller may be further configured to execute the instructions that cause the electronic device to obtain an addition request to add one or more new applications to the plurality of applications in the electronic device. the LDM controller may be further configured to execute the instructions that cause the electronic device to add at least one new lightweight adapter to the plurality of lightweight adapters for the one or more new applications obtained, wherein the at least one new lightweight adapter is trained for each new application of the one or more new applications.

The various actions, acts, blocks, operations, or the like in the method is performed in the order presented, in a different order or simultaneously. Further, in some embodiments, some of the actions, acts, blocks, operations, or the like are omitted, added, modified, skipped, or the like without departing from the scope of the proposed method.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. A method for generating content using a diffusion model of an electronic device, the method comprising:
    obtaining, by the electronic device, latent vectors of an input content, wherein the input content belongs to a first application type from among a plurality of applications in the electronic device;
    inputting, by the electronic device, the latent vectors into a first lightweight adapter configured for the first application type from among a plurality of lightweight adapters configured individually for application types of the plurality of applications;
    transforming, by the electronic device, the latent vectors of the input content into a plurality of intermediate latent vectors using the first lightweight adapter, wherein the plurality of intermediate latent vectors are closer to a final content belonging to the first application type;
    performing, by the electronic device, a denoising operation to transform the plurality of intermediate latent vectors into a plurality of next operation vectors using a denoising U-Net of the electronic device;
    obtaining, by the electronic device, the final content belonging to the first application type by decoding the next operation vectors; and
    outputting, by the electronic device, the final content.

2. The method as claimed in claim 1, wherein the plurality of lightweight adapters are trained for the application types of the plurality of applications individually and the denoising operation is trained for the application types of the plurality of applications.

3. The method as claimed in claim 1, further comprising:
    training, by the electronic device, the plurality of lightweight adapters, to obtain the plurality of intermediate latent vectors with the denoising U-Net.

4. The method as claimed in claim 3, wherein training, by the electronic device, the plurality of lightweight adapters, to obtain the plurality of intermediate latent vectors with the denoising U-Net comprises:
    obtaining, by the electronic device, a request to generate the input content;
    determining, by the electronic device, a plurality of iterations required to obtain the input content using the encoder wherein the plurality of iterations vary based on the application types from the plurality of applications associated with the input content;
    determining, by the electronic device, a denoising count indicating a first number of iterations of the plurality of iterations to be performed by the denoising U-Net, and an adapter count indicating a second number of iterations of the plurality of iterations to be performed by at least one lightweight adapter of the plurality of lightweight adapters;

performing, by the electronic device, the denoising operation for each first iteration of the first number of iterations by the denoising U-Net (208) to obtain a first output and an output operation for each second iteration of the second number of iterations by the at least one lightweight adapter of the plurality of lightweight adapters to obtain a second output, wherein the denoising operation and the output operation are simultaneously performed;

comparing, by the electronic device, the first output and the second output to determine a reconstruction loss; and updating, by the electronic device, an adapter weight based on the reconstruction loss.

5. The method as claimed in claim 1, wherein obtaining, by the electronic device, the latent vectors of the input content comprises:

adding, by the electronic device, a Gaussian noise to obtain an input noisy content associated with the input content; and determining, by the electronic device, the latent vectors of the input content based on a set of training data using a conditional neural network (c-NN) or the encoder.

6. The method as claimed in claim 1, wherein transforming, by the electronic device, the latent vectors of the input content into the plurality of intermediate latent vectors using the first lightweight adapter comprises:

determining, by the electronic device, a query vector, a key vector, and a value vector of the latent vectors of the input content; and performing, by the electronic device, a normalization non-linear regression method on the query vector, the key vector, and the value vector to obtain the plurality of intermediate latent vectors.

7. The method as claimed in claim 1, wherein performing, by the electronic device, the denoising operation to transform the plurality of intermediate latent vectors into the plurality of next operation vectors using the denoising U-Net of the electronic device comprises:

performing, by the electronic device, a vector transformation at of a plurality of denoising time operations of the denoising operation for transforming the plurality of intermediate latent vectors.

8. The method as claimed in claim 7, wherein performing, by the electronic device, the vector transformation at the plurality of denoising time operations of the denoising operation for transforming the plurality of intermediate latent vectors comprises:

determining, by the electronic device, key vectors and value vectors of the plurality of intermediate latent vectors using the first lightweight adapter; and performing, by the electronic device, a weighted sum method using the first lightweight adapter on the key vectors and the value vectors based on attention weights determined to obtain the plurality of next operation vectors.

9. The method as claimed in claim 1, further comprising:

obtaining, by the electronic device, an addition request to add one or more new applications to the plurality of applications in the electronic device; and adding, by the electronic device, at least one new lightweight adapter to the plurality of lightweight adapters for the one or more new applications obtained, wherein the at least one new lightweight adapter is trained for each new application of the one or more new applications.

10. The method as claimed in claim 1, wherein obtaining, by the electronic device, the final content belonging to the first application type by decoding the next operation vectors comprises:

sampling, by the electronic device, the plurality of operation vectors using the decoder;

determining, by the electronic device, the final content matches a predicted output of the input content; and indicating, by the electronic device, the input content is correctly decoded, based on a determination that the final content matches the predicted output of the input content.

11. An electronic device for generating content using a diffusion based model, comprising:

memory storing instructions;

at least one processor; and a latent diffusion model (LDM) controller, operatively coupled to the memory and the at least one processor, wherein the LDM controller is configured to execute the instructions that cause the electronic device to:

obtain latent vectors of an input content using an encoder, wherein the input content belongs to a first application type from among a plurality of applications in the electronic device;

input the latent vectors into a first lightweight adapter configured for the first application type from among a plurality of lightweight adapters configured individually for application types of the plurality of applications;

transform the latent vectors of the input content into a plurality of intermediate latent vectors using the first lightweight adapter, wherein the plurality of intermediate latent vectors are closer to a final content belonging to the first application type;

perform a denoising operation to transform the plurality of intermediate latent vectors into a plurality of next operation vectors using a denoising U-Net;

obtain the final content belonging to the first application type by decoding the next operation vectors using a decoder; and output the final content.

12. The electronic device as claimed in claim 10, wherein the plurality of lightweight adapters are trained for the application types of the plurality of applications individually and the denoising operation is trained for the application types of the plurality of applications.

13. The electronic device as claimed in claim 10, wherein the LDM controller is further configured to execute the instructions that cause the electronic device to:

train the plurality of lightweight adapters to obtain the plurality of intermediate latent vectors with the denoising U-Net.

14. The electronic device as claimed in claim 12, wherein the LDM controller is further configured to execute the instructions that cause the electronic device to:

obtain a request to generate the input content;

determine a plurality of iterations required to generate the input content using the encoder, wherein the plurality of iterations vary based on the application types from the plurality of applications associated with the input content;

determine a denoising count indicating a first number of iterations of the plurality of iterations to be performed by the denoising U-Net, and an adapter count indicating a second number of iterations of the plurality of iterations to be performed by at least one lightweight adapter of the plurality of lightweight adapters;

perform the denoising operation for each first iteration of the first number of iterations by the denoising U-Net to obtain a first output and an output operation for each second iteration of the second number of iterations by the at least one lightweight adapter of the plurality of lightweight adapters to obtain a second output, wherein the denoising operation and the output operation are simultaneously performed;

compare the first output and the second output to determine a reconstruction loss; and update an adapter weight based on the reconstruction loss.

15. The electronic device as claimed in claim 10, wherein the LDM controller is further configured to execute the instructions that cause the electronic device to:

add a Gaussian noise to generate an input noisy content associated with the input content; and determine the latent vectors of the input content based on a set of training data using a conditional neural network (c-NN) or the encoder.

16. The electronic device as claimed in claim 10, wherein the LDM controller is further configured to execute the instructions that cause the electronic device to:

determine a query vector, a key vector, and a value vector of the latent vectors of the input content; and perform a normalization non-linear regression method on the query vector, the key vector, and the value vector to obtain the plurality of intermediate latent vectors.

17. The electronic device as claimed in claim 10, wherein the LDM controller is further configured to execute the instructions that cause the electronic device to:

perform a vector transformation at a plurality of denoising time operations of the denoising operation for transforming the plurality of intermediate latent vectors.

18. The electronic device as claimed in claim 16, wherein the LDM controller is further configured to execute the instructions that cause the electronic device to:

determine key vectors and value vectors of the plurality of intermediate latent vectors using the first lightweight adapter; and perform a weighted sum method using the first lightweight adapter on the key vectors and the value vectors to obtain the plurality of next operation vectors.

19. The electronic device as claimed in claim 10, wherein the LDM controller is further configured to execute the instructions that cause the electronic device to:

obtain an addition request to add one or more new applications to the plurality of applications in the electronic device; and add at least one new lightweight adapter to the plurality of lightweight adapters for the one or more new applications obtained, wherein the at least one new lightweight adapter is trained for each new application of the one or more new applications.

20. A non-transitory computer-readable storage medium storing instructions, wherein the instructions, when executed by at least one processor, cause the electronic device to perform:

obtain latent vectors of an input content using an encoder, wherein the input content belongs to a first application type from among a plurality of applications in the electronic device;

input the latent vectors into a first lightweight adapter configured for the first application type from among a plurality of lightweight adapters configured individually for application types of the plurality of applications;

transform the latent vectors of the input content into a plurality of intermediate latent vectors using the first lightweight adapter, wherein the plurality of intermediate latent vectors are closer to a final content belonging to the first application type;

perform a denoising operation to transform the plurality of intermediate latent vectors into a plurality of next operation vectors using a denoising U-Net;

obtain the final content belonging to the first application type by decoding the next operation vectors using a decoder; and output the final content.

* * * * *